United States Patent [19]

Anderson

[11] 4,429,359

[45] Jan. 31, 1984

[54] INVERTER CIRCUIT WITH SYMMETRY CONTROL

[75] Inventor: Thomas E. Anderson, South Euclid, Ohio

[73] Assignee: General Electric Company, Schenectady, N.Y.

[21] Appl. No.: 334,291

[22] Filed: Dec. 24, 1981

[51] Int. Cl.³ .......................................... H02M 7/537
[52] U.S. Cl. ..................................... 363/132; 363/98; 363/17; 363/56
[58] Field of Search .............................. 363/17, 24–26, 363/55–56, 97–98, 131–134

[56] References Cited

U.S. PATENT DOCUMENTS

| | | |
|---|---|---|
| 2,928,994 | 3/1960 | Widakowich . |
| 3,146,406 | 8/1964 | Wilting . |
| 3,155,875 | 11/1964 | Wenrich et al. ................. 363/132 X |
| 3,414,801 | 12/1968 | Bishop et al. ........................ 363/132 |
| 3,611,021 | 10/1971 | Wallace . |
| 3,723,848 | 3/1973 | Miller . |
| 3,859,586 | 1/1975 | Wadlington ......................... 363/56 |
| 4,042,855 | 8/1977 | Buenzli . |
| 4,053,813 | 10/1977 | Kornrumpf . |
| 4,060,751 | 11/1977 | Anderson . |

FOREIGN PATENT DOCUMENTS

| | | |
|---|---|---|
| 1229590 | 4/1971 | United Kingdom . |
| 1508423 | 4/1978 | United Kingdom . |
| 1525544 | 9/1978 | United Kingdom . |
| 1537754 | 1/1979 | United Kingdom . |
| 1569773 | 6/1980 | United Kingdom . |
| 2072964 | 10/1981 | United Kingdom . |
| 594567 | 2/1978 | U.S.S.R. .............................. 363/132 |

*Primary Examiner*—Peter S. Wong
*Attorney, Agent, or Firm*—Philip L. Schlamp; Fred Jacob

[57] ABSTRACT

An inverter circuit having transistor switches connected to alternately and repetitively apply a-c electrical energy to a load such as a fluorescent lamp. An oscillator control circuit supplies control pulses to the transistor switches in a manner to control their switching to insure a symmetrical waveform at the load. D-C power for the oscillator control circuit is obtained by rectification of the a-c load energy, and the oscillator frequency is adjustable by means of a control voltage.

6 Claims, 5 Drawing Figures

INVERTER CIRCUIT WITH SYMMETRY CONTROL

CROSS-REFERENCE TO RELATED APPLICATION

Ser. No. 184,648, filed Sept. 5, 1980, Thomas E. Anderson et al, "Stored Charge Inverter Circuit", assigned the same as this invention.

BACKGROUND OF THE INVENTION

The invention is in the field of inverter circuits employing switches, such as transistors, for producing a-c output energy from d-c input energy.

Inverter circuits generally are classified in the form of three known circuit configurations: full bridge, half bridge, and push pull; and employ one or more switching devices, such as transistors, connected to alternately and repetitively apply electrical energy in a-c form to a load such as a motor, induction heating device, or one or more electric lamps. The inverter circuit is intended to deliver to the load an a-c waveform that is symmetrical, i.e. which deviates to equal plus or minus voltage and current values from its zero or median reference value and which has approximately equal time periods of plus and minus voltage values during its repetitive cycles. If the a-c waveform delivered to the load should become non-symmetrical, even for a short time, the load might become electrically or magnetically saturated (especially if the load is inductive or if it includes a transformer), which can cause a failure in the inverter circuit such as shorting of transistors or shorting or burning out of transformer windings. Such a non-symmetry of the inverter waveform can be caused by a premature switching of an inverter transistor due to extraneous or transient voltage pulses in the circuit, such as can be caused by power line voltage transients or by radiation from nearby electrical appliances or equipment.

The above-referenced patent application in directed to an inverter circuit of the half bridge type, and the present invention will specifically be described with respect to an improved control oscillator having symmetry control for such an inverter circuit.

SUMMARY OF THE INVENTION

Objects of the invention are to provide an improved inverter circuit, and to provide an inverter circuit having control means for insuring a symmetrical output waveform.

The invention comprises, briefly and in a preferred embodiment, an inverter circuit having transistor switches connected to alternately and repetitively apply a-c electrical energy to a load such as a fluorescent lamp. An oscillator control circuit supplies control pulses to the transistor switches in a manner to control their switching to insure a symmetrical waveform at the load. D-C power for the oscillator control circuit is obtained by rectification of the a-c load energy, and the oscillator frequency is adjustable by means of a control voltage.

DESCRIPTION OF THE PRIOR ART (FIGS. 1 AND 2)

The prior art illustrated in FIGS. 1 and 2, and its possible malfunctioning due to non-symmetrical operation, will first be described, followed by a description of the invention and how it prevents the malfunctioning.

Figure 1:
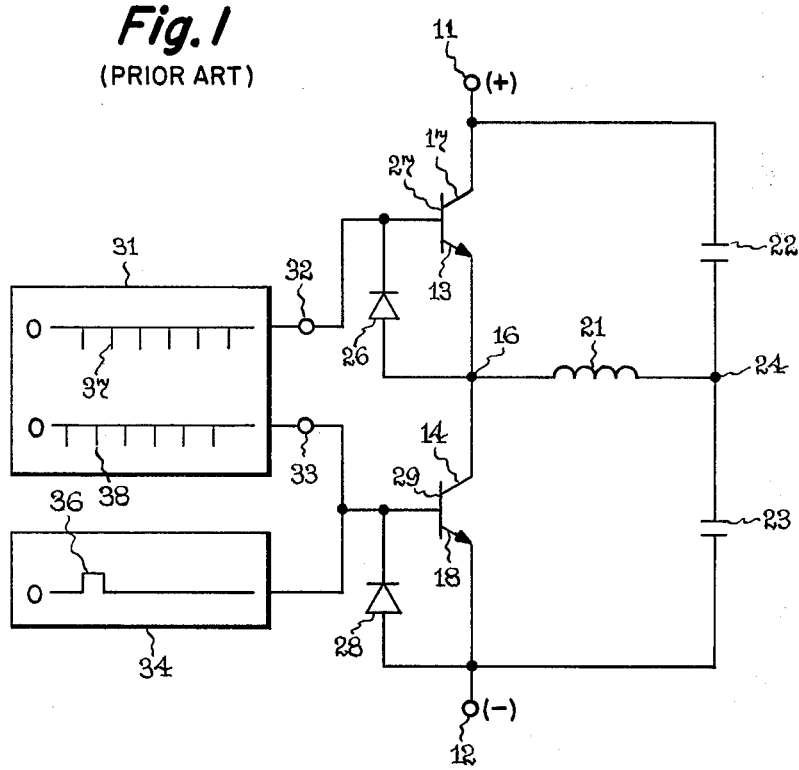
FIG. 1 is a schematic diagram of a prior-art inverter circuit of the above-referenced patent application.

In FIG. 1, a pair of transistors Q1 and Q2 are connected between terminals 11 and 12 of a d-c electricl power source which may be a full-wave bridge rectifier providing about 200 volts d-c from a 120 volt a-c input. As indicated in the drawing, terminal 11 is positive-polarity and terminal 12 is negative-polarity. The emitter 13 of transistor Q1 and the collector 14 of transistor Q2 are connected together to form a junction point 16; the collector 17 of transistor Q1 is connected to the positive power terminal 11 and the emitter 18 of transistor Q2 is connected to the negative power terminal 12. A load 21, which is inductive or has an inductive component, such as a gas discharge lamp, motor, inductive heating unit, etc., is connected between the junction point 16 and the power source, the latter connection being provided by a pair of capacitors 22, 23 connected in series between the power terminals 11 and 12, the load 21 being connected to the junction 24 of the capacitors 22, 23. The capacitance valves of the capacitors 22, 23 preferably are equal and sufficiently large to provide a low impedance at the operating frequency of the circuit (such as 1 KHz or higher). Thus, the load 21 is in effect connected between the transistor junction point 16 and a center-tap of the power source. The load 21 may include a coupling transformer, with the primary winding thereof connected between circuit points 16, 24 as shown.

A diode 26 is connected between the base 27 and emitter 13 of the transistor Q1, in a manner to pass positive-polarity current to the base 27. Another diode 28 is connected between the base 29 and emitter 18 of transistor Q2, in a manner to pass negative-polarity current from the base 29. A source 31 of turn-off pulses is connected to terminals 32 and 33 which are respectively connected to the base electrodes 27 and 29, and applies negative-polarity turn-off pulses alternately and repetitively to these electrodes at a frequency rate of about 1 KHz or greater and preferably about 20 kHz. A source 34 of a positive-polarity turn-on pulse is connected to one of these base electrodes 29. The turnoff pulse source 31 may be a multivibrator "flip flop" circuit, or individual pulse sources properly synchronized, and the turn-on pulse source 34 may be a one-shot multivibrator.

Figure 2:
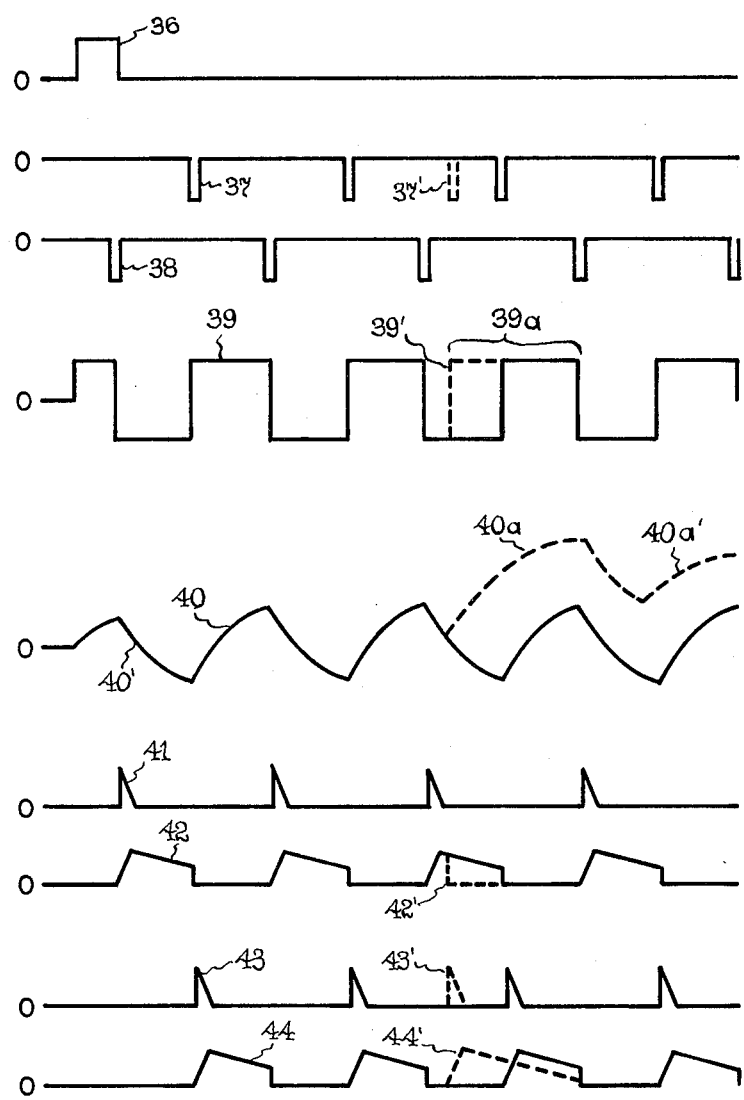
FIG. 2 is a time-plot showing of certain signals, voltage, and current in the circuit of FIG. 1, with dashed-line showings of malfunctioning which can occur due to undesirable non-symmetrical functioning of the circuit.

In FIG. 2, certain signals, voltage, and current in the circuit of FIG. 1 are shown in vertically aligned time sequence, as follows. A single positive-polarity turn-on pulse 36 is provided by the source 34 and applied to the base 29 of transistor Q2 for initiating circuit operation.

Repetitive negative-polarity turn-off pulses 37 and 38 are provided by the source 31 and applied respectively to the base electrodes 27 and 29 of transistor Q1 and Q2. These series of turn-off pulses 37, 38 are staggered 180 electrical degrees with respect to each other. Curves 39 and 40 respectively depict the voltage and current at the load 21, the voltage 39 having a square wave shape due to the alternate switching of transistors Q1 and Q2, and the current 40 having a typical wave shape for a load having an inductive component. Curves 41 and 42 respectively depict the inductive load fly-back current, and the resulting stored charge, at the base of transistor Q1. Similarly, curves 43 and 44 respectively depict the inductive load fly-back current, and the resulting stored charge, at the base of transistor Q2.

The circuit functions as follows. The turn-on pulse 36 renders transistor Q2 fully conductive, thus drawing current 40 through the load device 21 via capacitors 22 and 23. Upon cessation of the turn-on pulse 36, and the occurrence of the next turn-off pulse 38 applied to the base 29 of transistor Q2, the transistor is rendered nonconductive and current ceases to flow in the load 21; however, stored energy in the inductive component of the load produces a "flyback" voltage and current 41 of positive-polarity which passes through the diode 26 to the base 27 of transistor Q1. This renders transistor Q1 fully conductive. During this time Q1 operates as an inverted transistor where the base-collector junction becomes the emitter and the base-emitter junction becomes the collector. A charge 42 is stored in Q1 during this time. When the inductive energy has dissipated the stored charge keeps the transistor Q1 conductive, thus passing current 40' through the load 21 via the capacitor 23, in the opposite direction to that of current flow when transistor Q2 conducts. The stored charge partly drains off, as shown by curve 42; however, the frequency of the turn-off pulses is chosen sufficiently high (20 kilohertz, for example) so that the next turn-off pulse 37 is applied to the base 27 while the stored charge is effective in maintaining conduction of the transistor. This turn-off pulse 37 drains off the stored charge and renders transistor Q1 nonconductive, and terminates the load current whereupon stored energy in the inductive component of the load 21 produces a fly-back voltage and current 43 (of negative-polarity at junction point 16) which is conducted through the collector-base junction of transistor Q2, and diode 28, and which is the equivalent of a positive-polarity pulse 43 applied to the base 29, as shown in the drawing, which renders transistor Q2 again conductive, operating in an inverted mode, and creates a stored charge 44 in the transistor which maintains the transistor in a fully conductive state until the next turn-off pulse 38 occurs. The process is repetitive and causes an alternating current 40 to flow in the load 21.

Many or most electronic circuits, including the type shown in FIG. 1, have unneeded or unwanted stray or transient voltage pulses occurring therein much of the time, which can cause erroneous functioning or malfunctioning of the circuit. These voltage pulses can be caused by power line voltage transients such as occur when motors and other devices on the power line system turn on and off, and by radiation from nearby appliances and equipment. In the circuit of FIG. 1, these unwanted voltage pulses can occur, for example, in the control voltage source 31, at electrodes of transistors Q1 and Q2, and in the other parts of the circuit such as the load 21 due to, for example, a sudden change in load impedance such as can be caused by flickering of fluorescent lamps in the load which produce voltage transients that are fed back into the circuit. By way of example, in FIG. 2 an unwanted transient voltage pulse 37' is shown among the control voltage pulses 37, which prematurely renders transistor Q1 nonconductive, resulting in a fly-back pulse 43' which renders Q2 conductive and creates therein a stored charge 44' and at the same time drains off the stored charge in Q1 as indicated at 42' in FIG. 2. This action prematurely switches and reverses the load voltage 39, as indicated at 39', and the load voltage remains at this half-cycle polarity for an unduly long time period, as indicated by the bracket 39a, until the next turn-off pulse 38 occurs. During this unduly long load voltage half-cycle 39a, the load current 40 continues to increase, as indicated at 40a, to a value considerably greater than normal, and the abnormal current continues, due to the resulting non-symmetry of the current waveform, for several succeeding cycles, as indicated at 40a', until the current waveform settles down and becomes symmetrical about its true intended zero value. This abnormally large load current, occurring over several cycles of operation, can damage or cause failure of the load and/or switching transistors Q1 and Q2 and other circuit components. Such circuit failure is even more likely to occur if the abnormally large load current causes magnetic saturation of the load thus decreasing the load impedance which causes a further increase in load current.

DESCRIPTION OF THE PREFERRED EMBODIMENT

Figure 3:
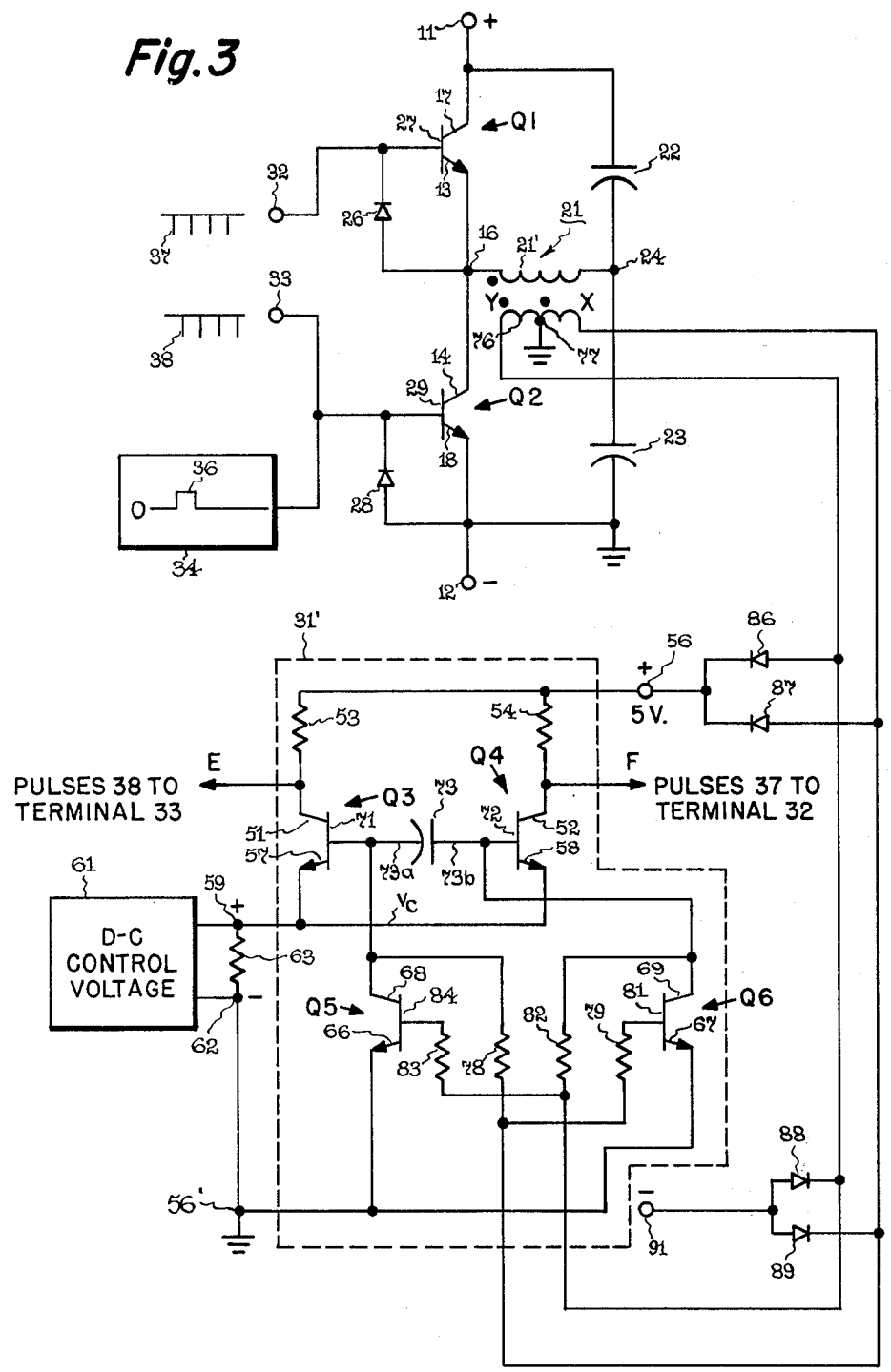
FIG. 3 is an electrical schematic diagram of a preferred embodiment of the present invention.

In the preferred embodiment of the invention, shown in FIG. 3, the inverter switching transistors Q1 and Q2 and associated circuitry are the same as in FIG. 1, the load 21 including a primary winding 21' of a load coupling transformer connected between circuit points 16 and 24. The source 31 of turn-off pulses of FIG. 1 is designated by the dashed-line box 31' in FIG. 3 which encloses an electrical schematic diagram of an inverter control circuit in accordance with the invention.

In a preferred embodiment of the invention, the inverter control circuit 31' comprises a pair of oscillatory switching control transistors Q3 and Q4 of which the collector electrodes 51 and 52 are respectively connected via resistors 53 and 54 to a terminal 56 of positive-polarity operating voltage and of which the emitter electrodes 57 and 58 are connected together and to a terminal 59 of a d-c variable control voltage source 61, the remaining terminal 62 thereof being connected to electrical ground. A resistor 63 is connected across the terminals 59, 62 and may comprise the internal output impedance of voltage source 61. The terminal 59 of d-c voltage source 61 is positive-polarity if transistors Q3, Q4 are NPN types, as shown.

A pair of clamping transistors Q5, Q6 have their emitter electrodes 66, 67 connected to electrical ground, and their collectors 68, 69 are respectively connected to the base electrodes 71, 72 of transistors Q3, Q4. A timing and correction control capacitor 73 is connected between the base electrodes 71, 72 of transistors Q3, Q4.

A center-tapped control winding 76 is electromagnetically coupled to the output transformer winding 21', and its center tap 77 is electrically grounded. An end X of winding 76 is connected via a resistor 78 to the base 71 of control transistor Q3 and also is connected, via a resistor 79, to the base 81 of clamping transistor Q6. The other end Y of winding 76 is connected via a resistor 82 to the base 72 of control transistor Q4 and also is connected, via resistor 83, to the base 84 of clamping transistor Q5. The turn-off pulses 37 are produced at the collector 52 of Q4 which is coupled to terminal 32, and the turn-off pulses 38 are produced at the collector 51 of Q3 which is coupled to the terminal 33, these pulse couplings being via transformer or other suitable means.

To provide d-c electrical power for the control circuit 31', a pair of rectifiers 86, 87 are respectively connected between the ends X, Y of winding 76 and the operating voltage terminal 56, their cathodes being connected to the terminal 56, in a manner to rectify current from the winding 76 and supply positive-polarity voltage and current to the terminal 56. The negative-polarity operating voltage for circuit 31' is obtained at circuit point 56' which is connected to electrical ground and hence to the center tap of winding 76. Another pair of rectifiers 88, 89 are shown respectively connected between the ends X, Y of winding 76 and a voltage terminal 91, their anodes being connected to the terminal 91 in a manner to rectify current from the winding 76 and supply negative-polarity voltage to the terminal 91, which voltage can be used for operating or biasing other circuits if so desired. Alternatively, the rectifiers 88, 89 can be connected to provide positive-polarity at terminal 91. The rectifier diodes 86, 87 provide a d-c control circuit operating voltage, for example five volts, at terminals 56, 56' from a-c energy of the winding 76 which in turn derives the energy from output winding 21 and ultimately from the power input terminals 11, 12. Thus, no separate d-c power source needs to be provided for the control circuit 31'. The relatively small power required to operate the circuit 31' has no detrimental effect on functioning of the inverter circuit and load 21.

Figure 4:
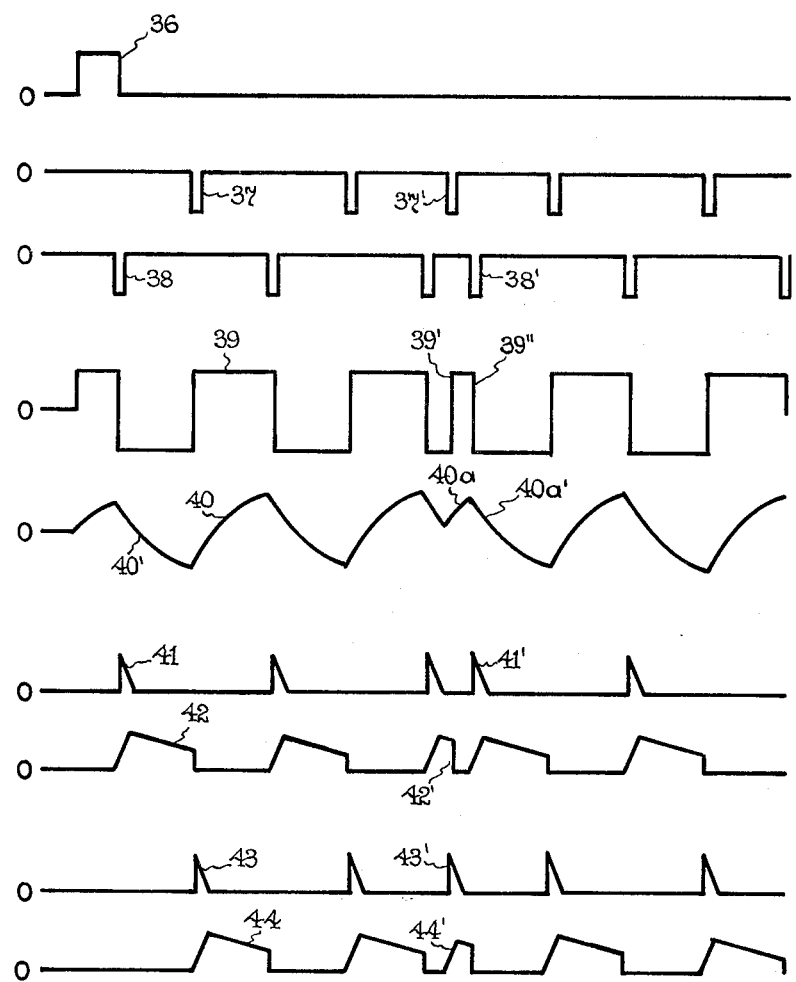
FIG. 4 is a time-plot showing of certain signals, voltage, and current in the inverter circuit of FIG. 3, arranged generally similar to the curves of FIG. 2 to facilitate comparison of functioning of the circuit of the invention (FIG. 3) with that of the prior art (FIG. 1).
Figure 5:
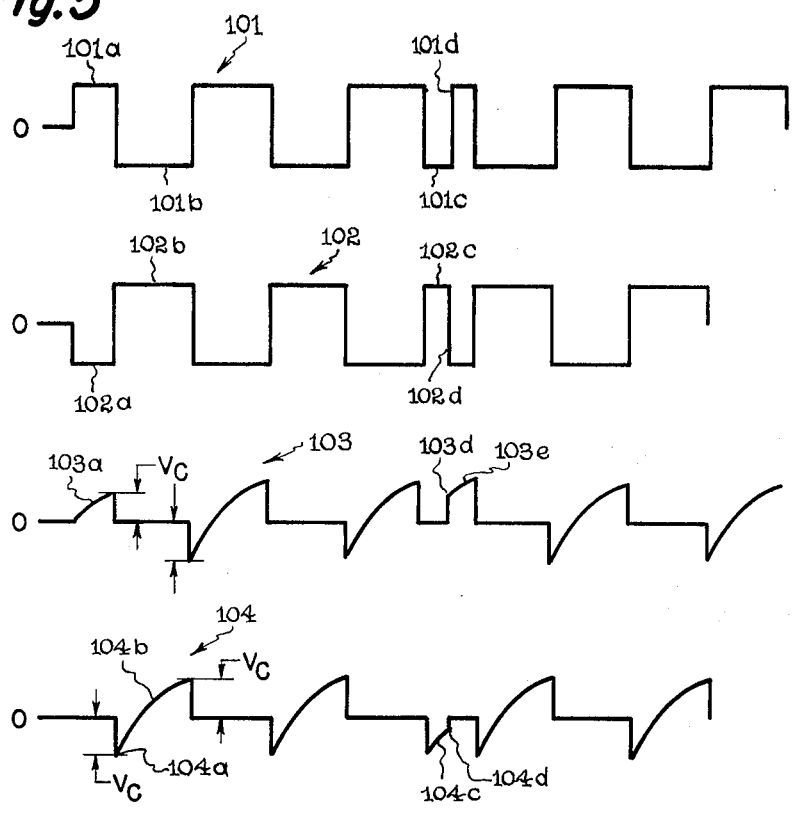
FIG. 5 is a time-plot showing of certain signals, voltages, and currents in a control oscillator portion of the inverter circuit of FIG. 3.
Figure 5:
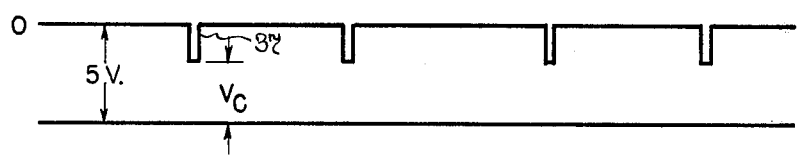
Figure 5:
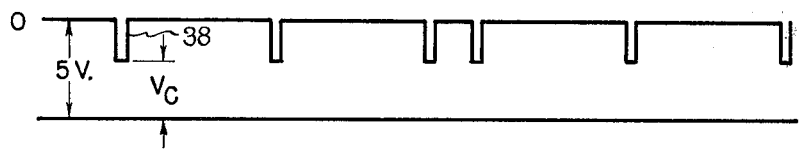

The general functioning of the inverter and control circuit of FIG. 3 will first be described with respect to FIG. 4, and then the specific functioning of the control circuit 31' will be described with respect to FIG. 5. In FIG. 4, the unwanted turn-off voltage pulse 37' is located the same as in FIG. 2; the starting pulse 36, and the portions of the turn-off pulses 37, 38, load voltage and current 39, 40, and fly-back and stored charge waveforms 41, 42, 43, 44 which are to the left of unwanted pulse 37' are the same as in FIG. 2. When the unwanted pulse 37' occurs, it turns off transistor Q1, causing the fly-back pulse 43' to occur which renders Q2 conductive and creates a stored charge 44' therein and at the same time drains off the Q1 stored charge as indicated at 42'; this action prematurely switches and reverses the load voltage 39 as indicated at 39', and the load current 40 reverses as indicated at 40a, all as has been described above with reference to FIG. 2. However, in accordance with the invention, and contrary to the functioning of FIG. 1 as illustrated in FIG. 2, the circuit of FIG. 3 does not malfunction and cause a destructive assymetrical load current; instead, FIG. 3 functions to produce the next turn-off pulse 38' for transistor Q2 relatively early, causing a fly-back pulse 41' for turning on Q1, so as to reverse the load voltage 40 at a timing indicated by numeral 39" to keep the load voltage 39 symmetrical, whereby the load current reversal 40a does not exceed its normal current peak before it again reverses at 40a' due to the load voltage reversal 39". Thereafter the circuit continues to function in its normal cyclical manner.

Upon starting of the inverter circuit of FIG. 3 by the starting pulse 36, the circuit functions generally as described with reference to FIG. 4. The turn-off pulse generating and control circuit 31' functions as follows, with reference to FIG. 5, in which waveform 101 is the voltage across the half of control winding 76 between its end X and its grounded center tap 77 and the waveform 102 is the voltage across the half of control winding 76 between its end Y and its grounded center tap 77, these voltages being 180 degrees out of phase with each other. Initially the control circuit 31' transistors Q3, Q4, Q5, and Q6 are nonconductive. The starting pulse 36 renders Q2 conductive and load current flows in transformer winding 21', inducing a voltage in control winding 76 that is positive-polarity 101a at end X and negative-polarity 102a at end Y. The positive voltage at end X is applied, via resistor 79, to base 81 of clamping transistor Q6 thus turning it "on" and clamping end 73b of capacitor 73 to ground, and also is applied, via resistor 78, to end 73a of capacitor 73, thus commencing the charging of the capacitor 73, as indicated by numeral 103a in capacitor waveform 103. When capacitor 73 is thus charged, to a voltage approximately equal to voltage Vc of the control voltage source 61 (which is the bias voltage of emitters 66 and 67 of Q3, Q4), it biases base 71 of Q3 so as to render Q3 conductive and clamp its collector 51 to control voltage Vc, generating a negative-polarity turn-off pulse 38 at collector 51, which is applied to terminal 33 and turns off Q2. This causes Q1 to turn on, due to fly-back induced voltage in the load 21, as described above, resulting in reversal of current in load winding 21', and also in control winding 76 as indicated at 101b and 102b in FIG. 5. With this reversal, end Y of control winding is positive, and applies positive voltage via resistor 83 to base 84 of clamping transistor Q5, turning it on and clamping the left end 73a of capacitor 73 to ground, and, since capacitor 73 has a voltage charge Vc from its previous charging 103a (with positive-polarity at end 73a), it now has a negative voltage Vc, as indicated at point 104a in FIG. 5. The positive voltage at end Y of winding 76 then charges the right end 73b of capacitor 73 in a positive-polarity direction, via resistor 82, as indicated by numeral 104b in FIG. 5, and when its voltage reaches approximately positive Vc, it renders Q4 conductive and clamps its collector 52 to control voltage Vc, generating a negative-polarity turn-off pulse 37 at collector 52, which is applied to terminal 32 and turns off Q1. This causes Q2 to turn on again, and the process repeats cyclically during normal operation. The voltage values of the turn-off pulses 37 and 38 are approximately the d-c operating voltage at terminal 56 (five volts, for example) minus the value Vc of the d-c control voltage from source 61. Adjusting the value of Vc controls the operating frequency of the circuit; for example, the greater the value of Vc, the longer it takes capacitor 73 to charge this value and cause switching, hence the switching frequency is made lower. Thus the operating frequency can be set to a desired value within a desired range, for example, a range of about 20 kHz to 50 kHz. Normally the frequency will be set for maximum performance of the system, and further in accordance with the invention the operating frequency can readily be charged, if desired, to maintain maximum performance in the event a change in load occurs, for example, if there is an increase or decrease in the number of fluorescent lamps in the load.

The control circuit 31' insures the symmetrical load voltage waveform 39 that has been described above with reference to FIG. 4, as follows. Now again referring to FIG. 5, assume that the control winding 76 operating waveform 101 at end X of the winding is negative-polarity as indicated by numeral 101c and the waveform 102 at end Y of the winding is positive-polarity as indicated by numeral 102c. Now assume an inadvertent premature switching of the circuit, which can be caused by a stray transient voltage pulse as described above, resulting in reversal of load current and of the control winding voltage waveforms 101 and 102 as indicated by numerals 101d and 102d. The end 73b of control capacitor 73, which was routinely charging toward positive, as indicated by numeral 104c, becomes clamped to ground zero by clamping transistor Q6 which is turned on by the control winding positive voltage charge 101d. At this point the capacitor 73 had charged to a value indicated by numeral 104d, which value becomes the charge starting voltage value 103d as the capacitor begins charging in the reverse direction via resistor 78. At whatever time the circuit should inadvertently switch, or "self-switch", the resulting reversal charging of capacitor 73 will similarly begin at the voltage value the capacitor had when the switching occurred, whereby the capacitor will charge more quickly to its next switching value Vc and in the same length of time, indicated by numeral 103e in the example shown, as the time period of its preceding shortened charging interval 104c. This achieves time symmetry of the load voltage 39 (FIG. 4) and as specifically indicated by numerals 39' and 39", whereby the load current 40 is caused to reverse, such as at 40a', before it can exceed its normal maximum value as was the case in the prior art as indicated by numeral 40a in FIG. 2.

The invention achieves its objectives of insuring symmetrical operation of an inverter circuit and preventing circuit component failures which could otherwise occur due to inadvertent premature switching of the circuit. The invention can be utilized for various types of inverter circuits, other than and including the type shown in FIGS. 1 and 3.

While preferred embodiments and modifications of the invention have been shown and described, various other embodiments and modifications thereof will become apparent to persons skilled in the art and will fall within the scope of the invention as defined in the following claims.

What I claim as new and desire to secure by Letters Patent of the United States is:

1. An inverter circuit comprising switching means for applying a symmetrical waveform alternating voltage to a load, said circuit being subject to inadvertent premature switching, wherein the improvement comprises a control circuit means connected to said load for deriving an alternating control voltage therefrom and connected to said switching means for controlling said switching means to switch and reverse polarity of said load voltage to limit the amplitude of said load voltage to a predetermined maximum voltage and to maintain time symmetry of said load voltage, so as to maintain said alternating load voltage waveform symmetrical upon occurrence of said inadvertent premature switching.

2. An inverter circuit comprising switching means for applying a symmetrical waveform alternating voltage to a load, said circuit being subject to inadvertent premature switching, wherein the improvement comprises a control circuit connected to control said switching means comprising a capacitor, a voltage source for charging said capacitor, charging means for causing said capacitor to partially charge from said voltage source during each half cycle of said alternating load voltage, means for causing said switching means to switch and reverse the polarity of said load voltage each time the charge on said capacitor reaches a given voltage value, means for causing the direction of charging in said capacitor to reverse upon each said switching of the switching means, and means for causing each charging cycle of said capacitor to begin with the voltage charge thereon retained from the termination of its immediately preceding charging cycle, so as to maintain said alternating load voltage waveform symmetrical upon occurrence of said inadvertent premature switching.

3. A circuit as claimed in claim 2, in which said control circuit further comprises first and second control transistors, impedance means respectively connecting the collector electrodes of said control transistors to a first terminal of said voltage source, means connecting the emitter electrodes of said control transistors to a circuit point of given voltage, said capacitor being connected between the base electrodes of said control transistors, first and second clamping transistors having their collector electrodes respectively connected to said base electrodes of the first and second control transistors and having their emitter electrodes connected to the second terminal of said voltage source, and a control winding coupled to said load to derive an alternating control voltage therefrom, impedance means respectively connecting a first end of said control winding to said base electrode of the first control transistor and to the base electrode of said second clamping transistor, and impedance means respectively connecting the second end of said control winding to said base electrode of the second control transistor and to the base electrode of said first clamping transistor.

4. A circuit as claimed in claim 3, in which said circuit point of given voltage comprises a variable d-c control voltage for controlling the switching frequency rate of said inverter circuit.

5. A circuit as claimed in claim 3 or 4, including rectifier means connected between at least one end of said control winding and one of said first and second voltage source terminals for producing at said terminals a d-c voltage derived from said alternating control voltage.

6. A circuit as claimed in claim 2, in which said voltage source comprises rectifier means coupled to said load.

* * * * *